United States Patent [19]

Bourque

[11] Patent Number: 5,247,967
[45] Date of Patent: Sep. 28, 1993

[54] PIPE REPAIR APPARATUS

[76] Inventor: Robert B. Bourque, 538 Glencoe Rd., Glencoe, Ill. 60022

[21] Appl. No.: 751,508

[22] Filed: Aug. 29, 1991

[51] Int. Cl.[5] .......................................... F16L 55/16
[52] U.S. Cl. ........................................ 138/99; 138/97
[58] Field of Search ............... 138/97, 98, 99; 24/279

[56] References Cited

U.S. PATENT DOCUMENTS

| | | | |
|---|---|---|---|
| 294,937 | 3/1884 | Towle | 138/99 |
| 730,693 | 6/1903 | Peak | 138/99 |
| 785,737 | 3/1905 | Jones | 138/99 |
| 832,753 | 10/1906 | Sherman | 138/99 |
| 1,261,221 | 4/1918 | Dutcher | 138/99 |
| 1,727,038 | 9/1929 | Rousey | 138/99 |
| 2,278,714 | 4/1942 | Stauffer | 138/99 |
| 2,279,642 | 4/1942 | Schreiner | 138/99 |
| 2,651,094 | 9/1953 | Dodge | 138/99 X |
| 2,712,326 | 7/1955 | Yurdin | 138/99 |
| 2,721,823 | 10/1955 | Hopkins et al. | 138/97 |
| 2,908,061 | 10/1959 | Adams | 138/99 X |
| 2,977,995 | 4/1961 | Walpole | 138/99 |
| 3,251,461 | 5/1966 | Smith | 138/97 |
| 4,155,574 | 5/1979 | Hulsey | 138/99 |
| 4,202,379 | 5/1980 | Vetter | 138/99 |
| 4,705,078 | 11/1987 | Montgomery | 138/99 |
| 4,889,167 | 12/1989 | Morris | 138/99 |
| 5,002,094 | 3/1991 | Brovont | 138/99 |

Primary Examiner—James E. Bryant, III
Attorney, Agent, or Firm—Patula & Associates

[57] ABSTRACT

An apparatus for repairing a pipe, comprising an adjustable strap to surround the pipe, and a rubberoid seal attached to a reinforcing plate having a slotted back so the plate and seal may rotate around the pipe while attached to the strap. The length of the strap can be adjusted by turning a screw on a coupling attached to end of the strap. The seal can be attached to the reinforcing plate with adhesive or double-sided tape.

2 Claims, 1 Drawing Sheet

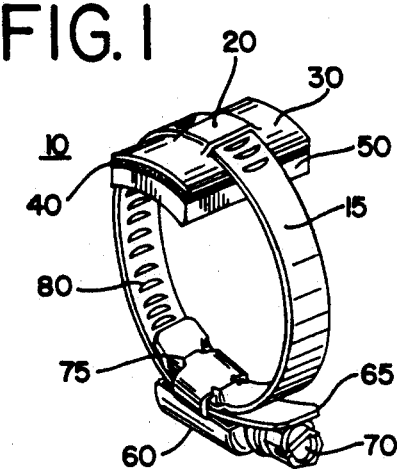
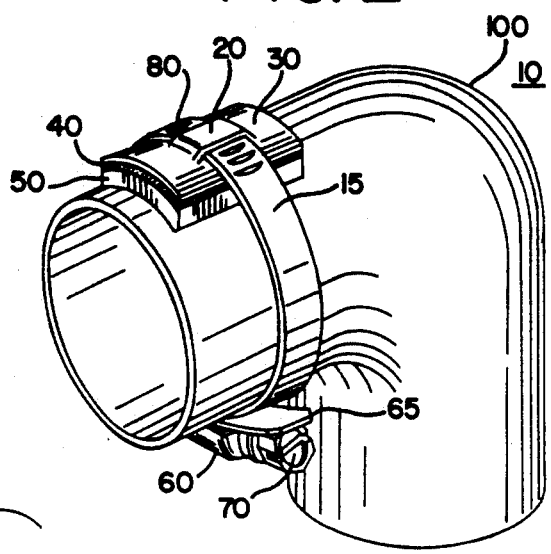
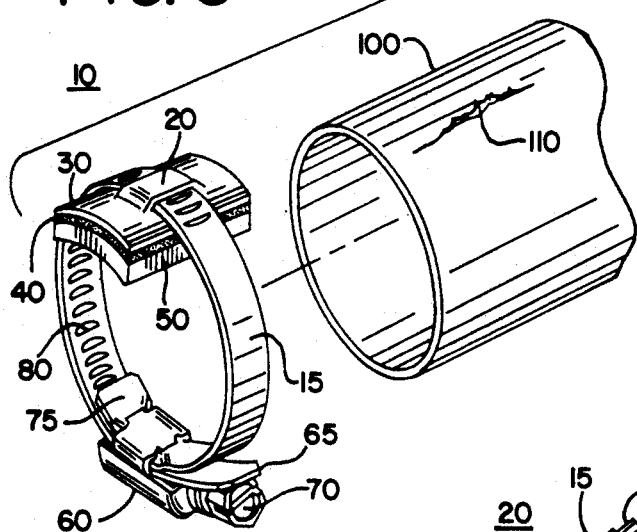
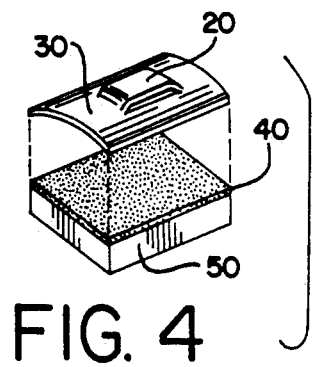
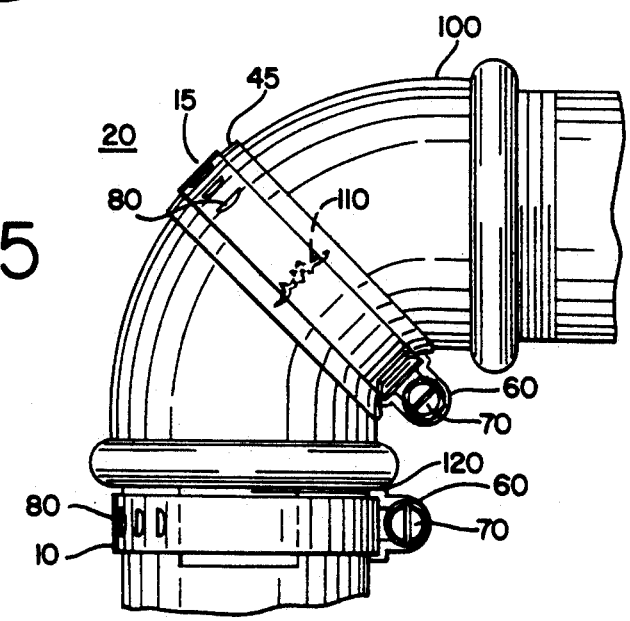

PIPE REPAIR APPARATUS

The present invention relates to an apparatus for the repair of pipes that are part of a plumbing system.

BACKGROUND OF INVENTION

The invention offers a device that can be used to fix a ruptured or cracked opening on the surface of a pipe. Until this time, most devices for repairing leaky pipes required the manipulation of many tools requiring special skills to effect the repair, therefore making most devices inconvenient for home use or by the unskilled. Frequently, the apparatus could not be placed without draining the pipe. Further, the design of these earlier apparati did not always allow the repair of leaks situated on difficult to access areas of pipe systems such as pipes located close to a wall or other places. The present invention allows such leaks in pipes to be repaired.

Various types of pipe repair clamps have been known in the past. For example, U.S. Pat. No. 2,279,642 to Schreiner, which discloses a means for repairing broken pipes. Unfortunately, Schreiner was designed to accommodate a pipe of fixed diameter, and is distinguishable from the Applicant's apparatus, which is fully adjustable, and capable of accommodating a wide variety of pipe diameters and resulting cracks or ruptures. Thus, where distributors, home owners or customers would have to retain a wide variety of devices of different diameters to accommodate different pipe sizes, Applicant's apparatus makes it necessary to inventory only one product, creating substantial inventory savings for distributors or retail outlets. Likewise, the customer can be prepared for a plumbing emergency by purchasing one device instead of the innumerable others of various sizes that he would have to otherwise.

Moreover, because of the complete adjustability of the device, it can be used to repair pipes, hoses and tubing of any diameter, and is not restricted to pipe, hoses and tubing of standard sizes.

U.S. Pat. No. 2,651,094 to Dodge, U.S. Pat. No. 2,908,061 to Adams, and U.S. Pat. No. 2,977,995 to Walpole, are likewise distinguishable because they do not provide a full range of adjustability for different pipe, hose or tubing diameters as does the Applicant's apparatus.

U.S. Pat. No. 4,155,574 to Hulsey, teaches a way to fit a wider variety of pipe diameters, but is intended only to couple two pipes together, not repair a ruptured or broken pipe.

U.S. Pat. No. 4,705,078 to Montgomery, and U.S. Pat. No. 2,278,714 to Stauffer, each suggest means for repairing broken pipe, but both are more cumbersome and complicated to use, requiring the use of more specialized tools, and would be difficult for an unskilled person or homeowner to quickly apply.

SUMMARY OF THE INVENTION

A pipe clamp apparatus for covering, sealing and stopping a rupture in a pipe, consisting in the preferred embodiment of a flexible strap, a rigid plate with sealing material, the rigid plate being positionably adjustable along the length of the flexible strap.

The preferred embodiment also includes a method of tightening the strap to the pipe, with one end containing an adjusting connector at one end of the strap that can accommodate the opposite end of the strap, so that the strap may be securely tightened around the pipe. By varying the length of the strap, the invention with associated structure can provide a manner for repairing ruptures on all sizes of pipes within a given minimum diameter.

The preferred embodiment allows the rigid plate to rotate freely around the strap, so that the proximity of the sealing material to the coupling may be adjusted for especially tight access or close clearance repair jobs.

Different embodiments may have a variety of different types of sealing material, some made out of a rubberoid or resilient material that can be cut and custom fit as the user may consider appropriate to the repair job.

It is the principal object of this invention to provide an improved way of sealing a rupture on a pipe with a single device.

It is a further object of the invention to provide a manner of repairing all types of pipe, tubing, or hose, including but not limited to, pipe, tubing or hose used: in ordinary plumbing applications, both commercial and domestic; for specialized applications, such as in manufacturing processes; for electrical applications, such as conduit utilized for the purpose of shielding electrical wiring; and for automotive fluid transport applications.

It is another object of the invention to provide a method of fixing pipes, tubes and hoses of a variety of materials, including, but not limited to, various metals and alloys, such as lead, tin, copper, bronze, steel, and brass; various plastics; and various natural and synthetic rubbers, and all pipes comprising composites and compositions of the materials described herein.

It is a further object of the invention that it prevent leaks of fluid, either liquids or gases, that are flowing through said pipes, tubes or hoses.

It is also an object of the invention to facilitate ordinary repairs by unskilled persons to ordinary household plumbing with a minimum of effort and using ordinary household tools.

Numerous other advantages and features of the invention will become readily apparent from the following detailed description of the preferred embodiment of the invention, from the claims, and from the accompanying drawings, in which like numerals are employed to designate like parts throughout the same.

BRIEF DESCRIPTION OF THE DRAWINGS

A fuller understanding of the foregoing will be had by reference to the accompanying drawings wherein:

FIG. 1 is a perspective view of the preferred embodiment of the pipe repair apparatus;

FIG. 2. is a perspective view of the preferred embodiment of the pipe repair apparatus in use and attached to a piece of pipe;

FIG. 3. is an exploded perspective view of the preferred embodiment showing the attachment of the apparatus to a damaged piece of pipe in a manner to cover a rupture;

FIG. 4. is an exploded perspective view of a rigid plate, adhesive and sealing material which may be made part of the invention; and FIG. 5. is a side perspective view of an alternative embodiment showing two different possible configurations of the sealing material.

DESCRIPTION OF PREFERRED EMBODIMENT

While this invention is susceptible of embodiment in many different forms, there is shown in the drawings and will herein be described in detail a number of embodiments of the invention. The invention disclosed herein is equally applicable to many other pipe repair embodiments besides the embodiments shown and described herein. It should be understood that the present disclosure is to be considered an exemplification of the principle of the invention and is not intended to limit the spirit and scope of the invention and/or claims to the embodiments illustrated.

Referring now to the drawings in FIG. 1, the device 10 in the preferred embodiment consists of strap 15 and rigid plate 30 having slotted back 20 and sealing material 50 attached to rigid plate 30 with adhesive 40. The adhesive can be either in the form of a glue, or by using a strip of foam with adhesive on both sides, commonly known as double-sided tape. Slotted back 20 allows rigid plate 30 to rotate freely around the length of strap 15.

Strap 15 has a first end 65, and a second end 75. The strap 15, may be made of a metal, such as stainless steel, or any other material such as high strength plastic. It may also vary in length so that the clamp may fit around pipes of various diameters and variously shaped ruptures. Disposed on second end 75 is an adjusting connector 60 adapted to accept the first end of the strap 65 to form a loop for encompassing a pipe 100, within the range set by the plurality of slots 80. The adjusting connector 60 has a rotating worm gear fastener 70, which can engage slots 80 disposed on at least substantially half of the length of the strap 15. When the rotating worm gear fastener 70 is rotated, it engages slots 80, increasing or decreasing the diameter of the strap 15. It is noted that an unslotted strap of the friction type or others is likewise usable.

FIG. 2 shows the device 10 secured on pipe 100. Device 10 has strap 15 with slots 80, and adjusting connector 60 on end 75, the adjusting connector also having worm gear fastener 70. Disposed on strap 15 is rigid plate 30 having slotted back 20, rigid plate 30 having sealing material 50 attached to the rigid plate 30 with adhesive 40.

FIG. 3 shows the device 10 being installed on pipe 100. The sealing material 50 is oriented with the rigid plate 30 having slotted back 20 on strap 15 to cover rupture 110 on pipe 100. Strap 15 with slots 80 has at first end 75 adjusting connector 60 with rotating worm gear fastener 70. Curved reinforcing plate 30 is best suited to seal an axial rupture 110 along a straight portion of pipe 100.

FIG. 4 shows rigid plate 30 with slotted back 20 and sealing material 50 attached to rigid plate 30 with adhesive 40

FIG. 5 shows an alternate embodiment 20. Instead of rigid plate 30 with slotted back 20 and sealing material 50 as used in device 10, the rupture is sealed with a resilient strip 45, which is made of rubberoid or other resilient material. Resilient strip 45 is best suited to seal a radial rupture in pipe 100, along any portion of the pipe 100.

To operate the invention 10, the operator uncouples the first end 65 of strap 15 from adjusting connector 60 by turning rotatable worm gear fastener 75 with a simple household tool such as a wrench or screwdriver. The strap 15 is then wrapped around the pipe in the area of the pipe rupture, and the first end 65 is reinserted into adjusting connector 60. Rigid plate 30 is then rotated around strap 15 so that it covers the rupture. Rotatable worm gear fastener 75 is then rotated using a wrench or a screwdriver so that it engages slots 80 of strap 15, tightening the strap 15 around the pipe, the strap 15 simultaneously exerting pressure on rigid plate 30, thereby pressing sealing material 50 against the rupture with enough force to completely seal the pipe. The completed repair is shown in FIG. 2.

FIG. 5 shows the versatility of the invention, as it can be used to repair ruptures on any part of the pipe, including threads and elbows.

What I claim is:

1. An apparatus for repairing a pipe, comprising:
    an adjustable strap having a first end and a second end, said strap further having a plurality of slots disposed therein on at least substantially half of the length of said strap;
    an adjusting connector disposed on said second end of said strap and adapted to accept said first end of said strap to form a loop for encompassing a pipe within the range set by the plurality of slots;
    a rotating worm gear fastener attached to said adjusting connector, said rotating worm gear fastener engages said slots in said strap so that when said rotating worm gear fastener is rotated, the loop varies in diameter so as to adjustably encompass various diameter pipes;
    a curved reinforcing plate movably disposed on said strap, said plate having a single raised slotted back for receiving said strap; and
    a sealing material attached to an underside of said plate by an adhesive, said material and said plate positionable along the length of the strap to cover and seal a leak in a pipe.

2. The apparatus of claim 1, wherein said sealing material attached to said plate is adapted to cover and seal an axial leak in a pipe.

* * * * *